US008284198B1

(12) United States Patent
Hackworth et al.

(10) Patent No.: US 8,284,198 B1
(45) Date of Patent: Oct. 9, 2012

(54) METHOD FOR VISUALIZING SPACE UTILIZATION IN STORAGE CONTAINERS

(75) Inventors: Brian Hackworth, San Jose, CA (US); Lokesh Shah, Bangalore (IN); Ramanthan PS, Bangalore (IN); Steve Klinkner, Fremont, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 827 days.

(21) Appl. No.: 12/074,440

(22) Filed: Mar. 3, 2008

(51) Int. Cl.
G06T 11/20 (2006.01)
G06F 7/00 (2006.01)
G06F 17/00 (2006.01)
(52) U.S. Cl. .................. 345/440; 707/609; 707/649
(58) Field of Classification Search .................. 345/440, 345/543, 544; 707/609, 649
See application file for complete search history.

(56) References Cited

U.S. PATENT DOCUMENTS

| | | | | |
|---|---|---|---|---|
| 5,103,394 A * | 4/1992 | Blasciak | ......................... | 714/47 |
| 5,210,872 A * | 5/1993 | Ferguson et al. | ............. | 718/102 |
| 5,403,639 A * | 4/1995 | Belsan et al. | ......................... | 1/1 |
| 5,550,790 A * | 8/1996 | Velamoor et al. | ............. | 367/140 |
| 6,049,798 A * | 4/2000 | Bishop et al. | ......................... | 1/1 |
| 6,404,444 B1 * | 6/2002 | Johnston et al. | ............. | 715/839 |
| 6,538,669 B1 * | 3/2003 | Lagueux et al. | ............. | 715/764 |
| 6,601,083 B1 * | 7/2003 | Reznak | ......................... | 718/104 |
| 7,103,847 B2 * | 9/2006 | Alford et al. | .................. | 715/772 |
| 7,111,021 B1 * | 9/2006 | Lewis et al. | ................... | 707/649 |
| 7,343,356 B2 * | 3/2008 | Prahlad et al. | ................. | 705/400 |
| 7,502,801 B2 * | 3/2009 | Sawdon et al. | ......................... | 1/1 |
| 7,555,719 B1 * | 6/2009 | Yehuda et al. | ................. | 715/736 |
| 7,606,990 B2 * | 10/2009 | Satoyama et al. | ............. | 711/162 |
| 7,657,721 B2 * | 2/2010 | Nakano et al. | ................. | 711/162 |
| 7,716,171 B2 * | 5/2010 | Kryger | .......................... | 707/649 |
| 7,765,167 B2 * | 7/2010 | Prahlad et al. | ................. | 705/400 |
| 7,784,027 B2 * | 8/2010 | Harrison | ....................... | 717/113 |
| 7,836,344 B2 * | 11/2010 | Morse et al. | ...................... | 714/33 |
| 7,840,533 B2 * | 11/2010 | Prahlad et al. | ................. | 707/610 |
| 8,032,675 B2 * | 10/2011 | Chang et al. | ..................... | 710/56 |
| 2004/0054866 A1 * | 3/2004 | Blumenau et al. | ............ | 711/202 |
| 2005/0193376 A1 * | 9/2005 | Harrison | ....................... | 717/127 |

* cited by examiner

*Primary Examiner* — M Good Johnson
(74) *Attorney, Agent, or Firm* — Blakely, Sokoloff, Taylor & Zafman LLP (57) ABSTRACT

A server system allows an administrator to visualize storage space utilization of a storage system. In one implementation, the server system monitors the amount of used storage space in a storage system with respect to different types of usage. The server system generates a Graphical User Interface comprising a graphical chart displaying the amount of used storage space relating to a period of time. The graphical chart includes a breakdown of the different types of usage over the period of time. In another implementation, the server system receives a user input applied on the graphical chart, adjusts an allocation of storage space in the storage system in response to the user input, and updates the graphical chart to reflect the adjusted allocation of the storage space. In yet another implementation, the server system receives a selection of one or more snapshots to be deleted, determines one or more common files to the selected snapshots, computes a potential amount of reclaimed storage space based on the selection and the one or more common files to the selected snapshots, and to update the graphical chart in response to the selection without actually deleting the selected snapshots.

14 Claims, 10 Drawing Sheets

METHOD FOR VISUALIZING SPACE UTILIZATION IN STORAGE CONTAINERS

FIELD OF THE INVENTION

Embodiments of the present invention relate to storage systems, and in particular, to a method for visualization of space utilization in storage systems.

BACKGROUND

A storage system is a processing system adapted to store and retrieve data on behalf of one or more client processing systems ("clients") in response to external input/output (I/O) requests received from clients. A storage system can provide clients with file-level access to data stored in a set of mass storage devices, such as magnetic or optical storage disks or tapes. Alternatively, a storage system can provide clients with block-level access to stored data, rather than file-level access, or with both file-level access and block-level access.

Data storage space can be organized into one or more storage "volumes" comprising physical storage disks (or other storage devices), defining an overall logical arrangement of storage space. The disks within a volume/file system are typically organized as one or more groups of Redundant Array of Independent (or Inexpensive) Disks (RAID).

Typically, provisioning is performed by storage administrators for large-scale storage systems allocating multiple file systems or Logical Unit Numbers (LUNs) from the same storage system. However, thin provisioning occurs when more storage is allocated than is actually present on the storage system. The allocated storage in thin provisioning situations may be vulnerable to running out of space on the underlying storage system.

Some visualization tools may be available to assist an administrator in monitoring and visualizing available storage space on the storage system. One conventional visualization tool allows the administrator to view a graphical chart displaying total space usage over time. However, such conventional visualization tool requires the administrator to configure storage settings by entering the numerical amount of storage space settings in another input window different from the graphical chart. The administrator would then have to reload the graphical chart to visualize the update. The visualization tool may also be able to calculate storage space that could be reclaimed by deleting snapshots (a read-only copy of the data set frozen at a point in time). However, common visualization tools cannot display a graphical visualization of the storage space that could be reclaimed until the selected files for deletion are actually deleted.

Accordingly, what is needed is a method to assist a storage administrator to immediately visualize the potential effects on the storage space breakdown of deleting one or several files of the storage system without actually deleting the files.

SUMMARY

Embodiments of the present invention provide a mechanism by which a server system allows a storage administrator to visualize storage space utilization of a storage system. In one embodiment, the server system monitors the amount of used storage space in a storage system with respect to different types of usage. The server system generates a Graphical User Interface comprising a graphical chart displaying the amount of used storage space relating to a period of time. The graphical chart displays a breakdown of the amount of used storage space by types of usage over the period of time. In another embodiment, a user input is applied directly on the graphical chart to adjust an allocation of storage space in the storage system. The server system adjusts the allocation of storage space in the storage system in response to the user input, and updates the graphical chart to reflect the adjustment. In yet another embodiment, the server system dynamically updates the graphical chart in response to a selection of one or more files to be deleted without actually deleting the files.

Other aspects of the invention will become apparent from the following detailed description taken in conjunction with the accompanying drawings, which illustrate the principles of the invention by way of example.

DETAILED DESCRIPTION

Embodiments of the present invention provide a mechanism by which a server system allows an administrator to visualize storage space utilization of a storage system. In one implementation, the server system includes a space monitoring engine that monitors used storage space in the storage system. The server system generates Graphical User Interface that includes a graphical chart displaying the amount of used storage space relating to a period of time. The graphical chart has several indicators or graph, with each indicator corresponding to a respective type of usage. For example, one of the graph may correspond to a total storage space usage over the period of time. In another embodiment, the server system adjusts an allocation of space in the storage system in response to a user input on the graphical chart. In yet another embodiment, the Graphical User Interface can display the amount of potential storage space reclaimed by deleting one or more selected used storage space (e.g. snapshots, which are a read-only copy of the data set frozen at a point in time) prior to the actual deletion of the selected used storage space.

System Architecture

Figure 1:
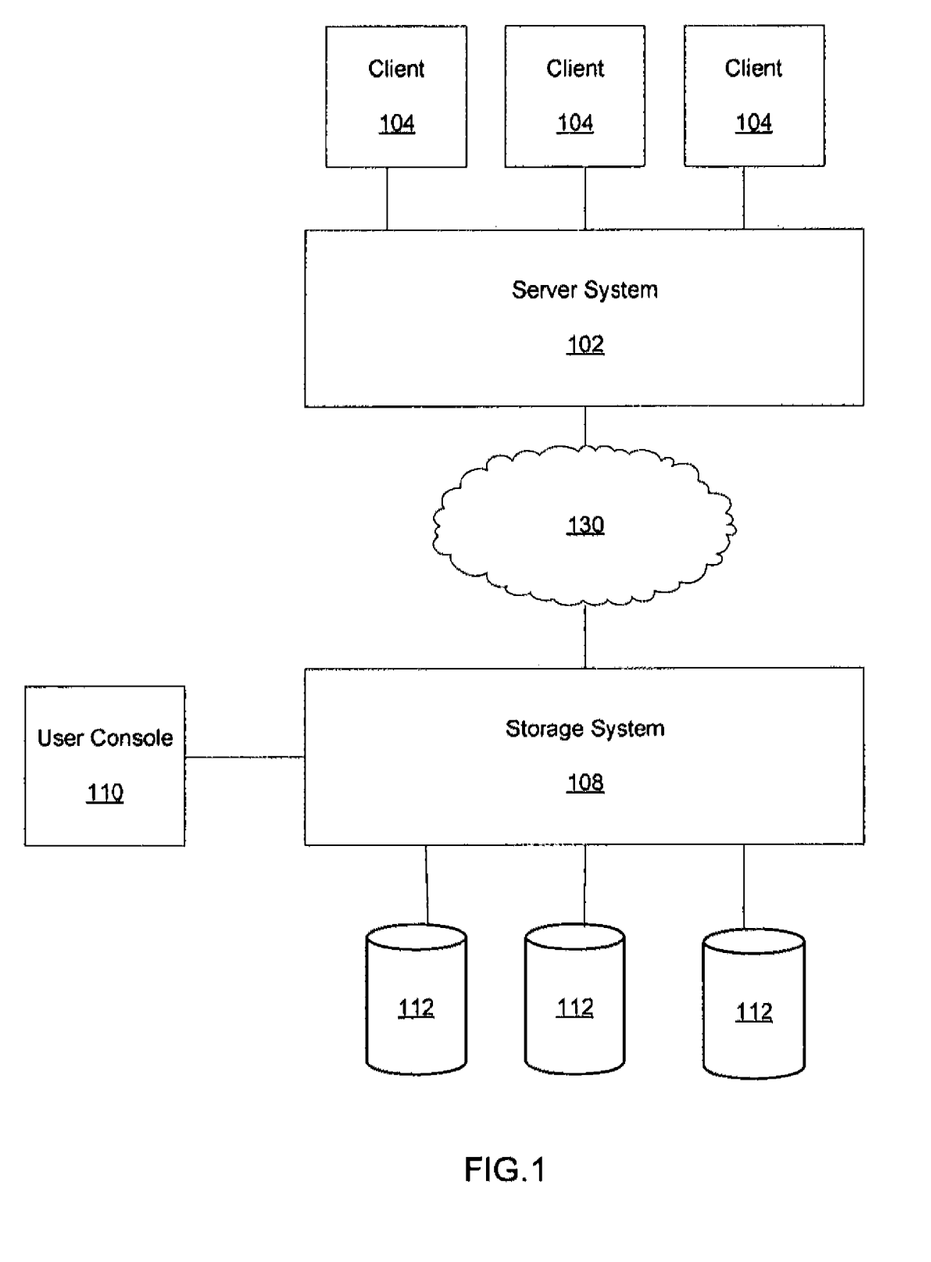
FIG. 1 is a diagram of network environment that includes a storage system and a server system capable of implementing visualization of space utilization according to an embodiment of the present invention.

In accordance with an embodiment of the present invention, FIG. 1 illustrates a server system 102 according to an embodiment of the present invention and a storage system 108. Server system 102 may be connected to one or more clients 104.

Server system 102 may be a computer that handles requests for data, electronic mail, file transfers, and other network services from other computers, i.e., clients 104. As will be described in greater detail herein, server system 102 may be a number of applications such as email server application or relational database management application. A person of ordinary skill in the art would understand that although the present invention is described in the context of an email server and database server for illustrative purposes only, server system 102 can execute any other application. Server system 102 can be connected to clients 104 over a network, such as a Local Area Network (LAN), Wide Area Network (WAN), or the like.

Server system 102 utilizes services of storage system 108 to store and manage data, such as for example, files, in a set of mass storage devices 112, such as magnetic or optical storage based disks or tapes. As used herein, the word "file" encompasses a container, an object, or any other storage entity. Interaction between server system 102 and storage system 108 can enable the provision of storage services. That is, server system 102 may request the services of the storage system 108, and the storage system 108 may return the results of the services requested by the server system 102, by exchanging packets over the connection system 130. Server system 102 may issue packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, server system 102 may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Storage system 108 may be coupled locally to server system 102 over connection system 106, such as a local area network (LAN), a wide area network (WAN), metropolitan are network (MAN) or the Internet.

As described herein, storage system 108 stores data on one or more writable storage device media, such as magnetic disks, video tape, optical, DVD, magnetic tape, or any other media adapted to store information persistently, including data and parity information. As illustratively described herein, the information is stored on disks 112. The disks 112 within a volume are typically organized as one or more RAID groups.

Storage system 108 can be connected to a user console 110, such as a monitor with a keyboard. A user can provision storage space on disks 112 via user console 110. To provision storage space, a user takes into consideration various factors, such as a schedule according to which data will be backed up on disk(s) 194, the retention plan (i.e., how long the data is going to be maintained), whether the data is going to be mirrored, and how often the data on disk(s) is going to change. According to an embodiment of the present invention, server system 102 may also be capable of provisioning storage space and monitoring storage space on disks 112.

Server System 102

Figure 2A:
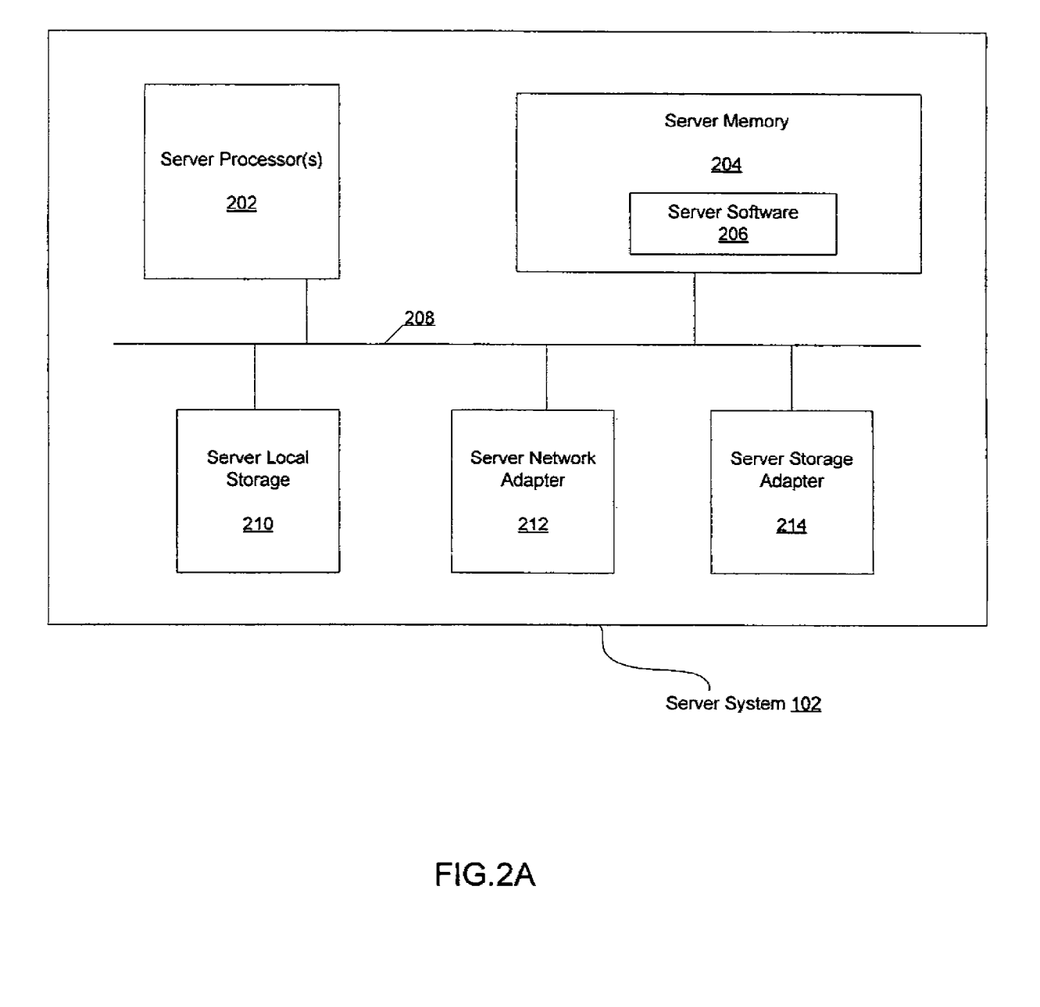
FIG. 2A is a block diagram illustrating various components of the server system shown in FIG. 1 according to an embodiment of the present invention.

Referring now to FIG. 2A, server system 102 comprises server processor(s) 202, server memory 204, a server network adapter 212, a server storage adapter 214, and a local storage 210 coupled by a bus 208.

The server processors 202 are the central processing units (CPUs) of the server system 102 and, thus, control the overall operation of the server system 102. In certain embodiments, the server processors 202 accomplish this by executing software, such as that described in more detail herein. Server processors 202 may be or include one or more programmable general-purpose or special-purpose microprocessors, digital signal processors (DSPs), programmable controllers, application specific integrated circuits (ASICs), programmable logic devices (PLDs), or the like, or a combination of such devices.

Server memory 204 comprises storage locations that are addressable by the processor 202 and adapters (a server network adapter 212 and a server storage adapter 214) for storing software program code, such as server software 206 and data structures used to perform the technique introduced herein. The server processor 202 and server adapters may, in turn, comprise processing elements and/or logic circuitry configured to execute the software code and manipulate various data structures. Server memory 204 can be a random access memory (RAM), a read-only memory (ROM), or the like, or a combination of such devices. It will be apparent to those skilled in the art that other processing and memory means, including various computer readable media, may be used for storing and executing program instructions pertaining to the invention described herein.

The server network adapter 212 comprises one or more ports adapted to couple the server system 102 to one or more clients 104 (shown in FIG. 1) over point-to-point links, wide area networks, virtual private networks implemented over a public network (Internet) or a shared local area network. The server network adapter 212 thus may comprise the mechanical, electrical and signaling circuitry needed to connect the node to the network.

The server storage adapter 214 cooperates with the server operating system 234 executing on the server system 102 to access data from disks 112 (shown in FIG. 1). The server storage adapter 214 comprises one or more ports having input/output (I/O) interface circuitry that couples to the disks 112 over an I/O interconnect arrangement, such as a conventional high-performance, fiber channel (FC) link topology.

Server local storage 210 is a device that stores information within server system 102, such as server software 206, server operating system 234, and data. Server system 102 loads server software 206 into server memory 204 from which they are accessed by server processors 202.

Figure 2B:
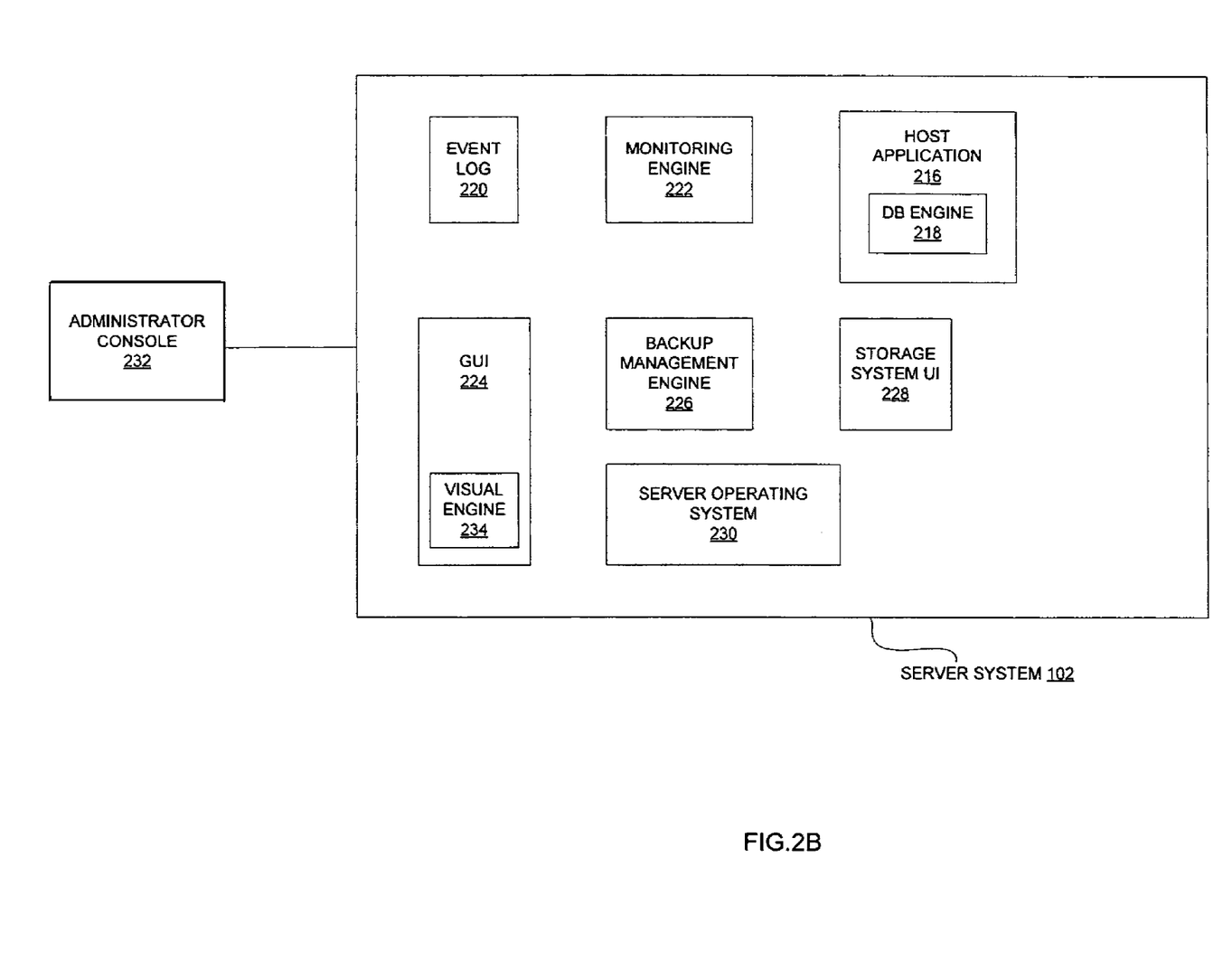
FIG. 2B is a block diagram illustrating various software components executed at the server system shown in FIG. 1 according to an embodiment of the present invention.

Referring now to FIG. 2B, according to embodiments of the present invention, server system 102 executes the following software: a host application(s) 216, a backup management engine 226, a graphical user interface engine 224, a storage system interface engine 228, a monitoring engine 222, and a server operating system 230. In one embodiment, these engines are implemented as modules. As used herein, the term "module" refers to computer program code adapted to provide the functionality attributed to the module upon execution by a processor. In other embodiments, the "module" could be a special purpose circuitry (e.g. ASICs, PLDs, etc). Host application(s) 216 can be, for example, Microsoft Exchange Server and Microsoft SQL Server, although the present invention contemplates that other host applications can be executed at server system 102. In the case of Microsoft Exchange Server, electronic messages are received from clients 104 by Microsoft Exchange Server and are passed to a database (DB) engine 218. DB Engine 218, in turn, stores the messages on disks 112 as files. As used herein, the term "file" encompasses a container, an object, or any other storage entity.

In Microsoft Exchange Server, a storage group (SG) is a unit for storing data. Each storage group may include a database file and a transaction log, which describes changes made to the database file. Backup management engine 226 causes the storage system 108 to back up storage groups using, for example, snapshot capability. The process of creating snapshots is described in U.S. patent application Ser. No. 10/090,963, entitled "System and Method for Creating a Point-in-time Restoration of Database File," by Dennis Chapman. Backup management engine 226 also causes storage system 108 to create a persistent point-in-time image (PPI) such as "snapinfo" files that are stored on disk(s) 112. A snapinfo file may include information about a particular snapshot. This information may be, for example, a time stamp when a particular snapshot was taken and location where the snapshot is stored on disk(s) 112. A backup dataset includes one or more snapshots of application data. A backup dataset may further include a transaction log of changes to the application data and one or more snapinfo files describing a backup dataset.

After backup management engine 226 initiates creation of snapshots by sending a command to storage system 108 via storage system user interface engine 228, storage operating system 306 of storage system 108 (shown in FIG. 3) creates snapshots and snapinfo files. Storage operating system 206 reports back to backup management engine 226 when the operation is completed. Storage system interface engine 228 is configured to act as an interface between server system 102 and storage system 108. Storage system interface engine 228 communicates with storage system 108.

Server system 102 further executes the monitoring engine 222. Monitoring engine 222 is configured to periodically monitor utilization of the storage space on a volume. To this end, storage system interface engine 228 sends a command(s) to reporting engine 308 at the storage system 108 (shown in FIG. 3), which monitors space utilization on the volume and provides to the monitored data storage system interface engine 228. Engine 228, in turn, passes the data to the monitoring engine 222. "Periodically monitoring" as used herein means obtaining information from time to time not necessarily at constant intervals. A person of ordinary skill in the art would understand that the utilized overwrite reserve space can be expressed in mega bytes (MB), kilo bytes (KB), giga bytes (GB) or in any other measure of computer storage, as well as by a fraction, such as a percentage (for example, if the utilized overwrite reserve space is 50%, it indicates that half of the overwrite reserve space has been used).

Monitoring engine 222 is also configured to periodically gather information about created backup datasets by reading snapinfo files. As described above, snapinfo files include information about snapshots, metadata files, a time stamp when a snapshot was taken, and location indicating where the snapshot is stored on disk(s) 112. In one embodiment, monitoring engine 222 sends the gathered information to Graphical User Interface 224 engine.

Graphical User Interface 224 engine includes a storage space visualization engine 234. Engine 224 may be configured to gather the information stored by the snapinfo files and to generate a graphical chart illustrating utilized storage space over a period of time. In another embodiment, engine 224 may also generate a user interactive graphical chart where a user may adjust provisioning settings on the graphical chart. Engine 224 dynamically updates the graphical chart in response to the new user settings. Other functionalities of engine 224 are further described with respect to FIGS. 7-9.

Server system 102 further executes the server operating system 230. Server operating system 230 is a program that is, after being initially loaded into server memory 204, manages host applications executed on server system 102. The server operating system 230 can be, for example, UNIX®, Windows NT®, Linux®, or any other general-purpose operating system.

Storage System

Figure 3:
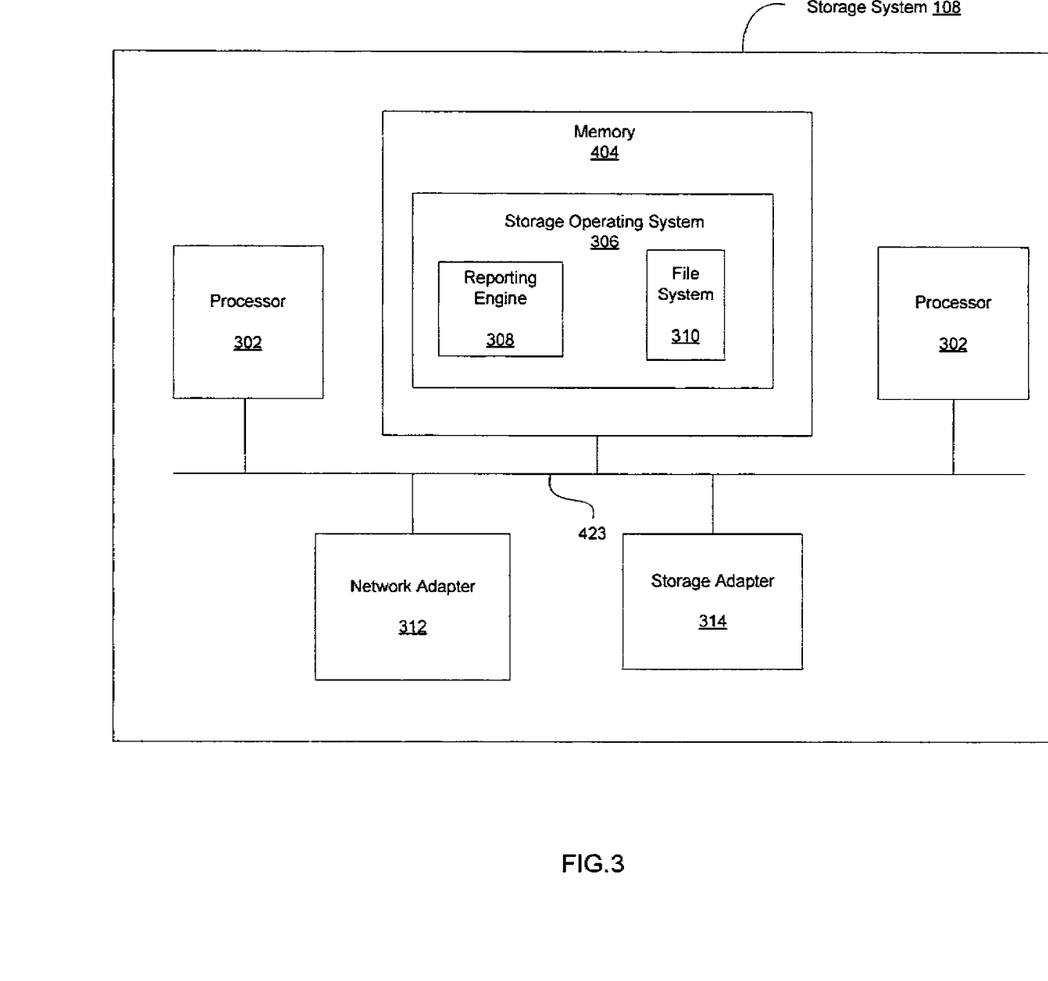
FIG. 3 is a diagram showing architecture of the storage system shown in FIG. 1 according to an embodiment of the present invention.

FIG. 3 is a diagram illustrating various components of the storage system 120, in accordance with an embodiment of the invention. Specifically, the storage system comprises a plurality of processors 302, a memory 304, a network adapter 312, and a storage adapter 314 interconnected by a system bus 323. Storage system 108 executes a storage operating system 306 that preferably implements a high-level module, such as a file system manager, to logically organize the information as a hierarchical structure of named directories, files and special types of files called virtual disks (hereinafter generally "blocks") on the disks.

The memory 304 comprises storage locations that are addressable by the processors and adapters for storing software program code and data structures associated with the present invention. The processor and adapters may, in turn, comprise processing elements and/or logic circuitry configured to execute the software code and manipulate various data structures. Storage operating system 306, portions of which are typically resident in memory 304 and executed by the processing elements, functionally organizes the storage system 108 by invoking storage operations in support of the storage service implemented by the storage system 108. It will be apparent to those skilled in the art that other processing and memory forms, including various computer readable media, may be used for storing and executing program instructions pertaining to the invention described herein. As illustrated herein, storage operating system 108 is in one embodiment the NetApp® Data ONTAP® operating system available from Network Appliance Inc., of Sunnyvale, Calif., that implements a Write Anywhere File Layout (WAFL™) file system. However, it is expressly contemplated that any appropriate storage operating system may be enhanced for use in accordance with the inventive principles described herein to facilitate access to disks. As used herein, the term "storage operating system" generally refers to the computer-executable code operable on a computer that manages data access.

The file system manager 310 "virtualizes" the storage space provided by the disks. The file system 310 logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored.

Storage operating system 306 further includes a reporting engine 308 configured to periodically monitor utilization of the space on a volume and to provide the results of the monitoring to server system 102.

The network adapter 312 comprises one or more ports adapted to couple storage system 108 to one or more server systems 102 over point-to-point links, wide area networks, virtual private networks implemented over a public network (Internet) or a shared local area network. The network adapter 312 thus may comprise the mechanical, electrical and signaling circuitry.

The storage adapter 314 cooperates with the storage operating system 306 to access information requested by server system 102. The storage adapter 314 comprises one or more ports having input/output (I/O) interface circuitry that couples to the disks over an I/O interconnect arrangement, such as a conventional high-performance, FC link topology.

Figure 4:
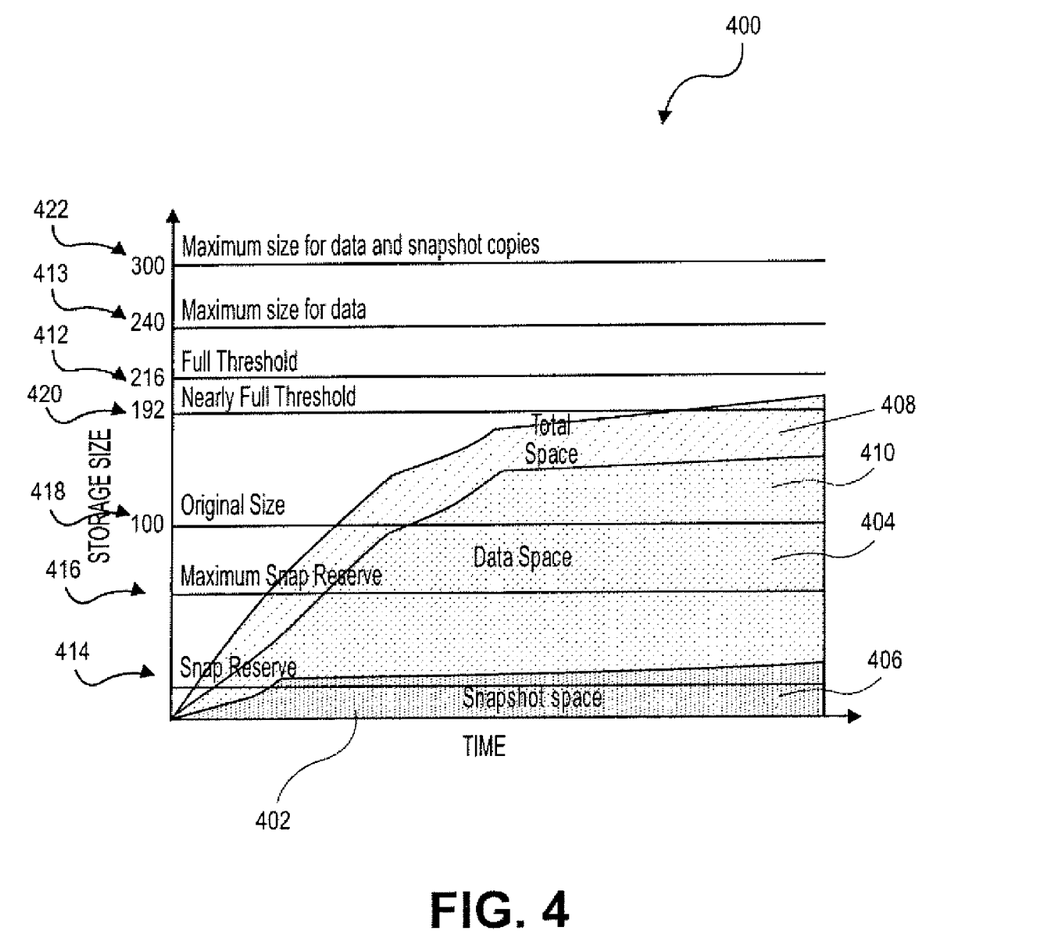
FIG. 4 is a diagram of an exemplary screen presented to a system administrator that allows the system administrator to visualize space utilization according to an embodiment of the present invention.

FIG. 4 illustrates a graphical chart 400 presented to a system/storage administrator of server system 102 to allow the system/storage administrator to visualize storage space utilization. In one embodiment, an area graph 402 may be used to display space utilization of logical storage container, such as a volume, over time. The horizontal axis in FIG. 4 represents time. The vertical axis in FIG. 4 represents storage size. FIG. 4 illustrates a breakdown of the types of storage space used in the container. For example, FIG. 4 illustrates over time the growth of snapshot space 406, data space 404, and total space 408. Snapshot space 406 represents storage space used for snapshots as previously defined over a period of time. Data space 404 represents storage space used for actual user data over a period of time. Total space 408 represents the combined storage space used for snapshots and actual user data.

Overlays may be used to display various space settings of the container so that the storage administrator can easily visualize how the space utilization grew over time. For example, a snap reserve line 414 on the graphical chart of FIG. 4 indicates the minimum amount of storage space set aside for snapshots. A maximum snap reserve line 416 on the graphical chart of FIG. 4 indicates the minimum amount of storage space set aside for snapshots. An original size line 418 on the graphical chart of FIG. 4 indicates an originally set amount of storage space set aside for data.

A nearly full threshold line 420 on the graphical chart of FIG. 4 indicates the amount of storage space set by the storage administrator where a first alert would be generated if the total amount of used storage space were to exceed the value of the nearly full threshold. A full threshold line 412 on the graphical chart of FIG. 4 indicates the amount of storage space set by the storage administrator where a second alert would be generated if the total amount of used storage space were the exceed the value of the full threshold. In one embodiment, the nearly full threshold and the full threshold settings are user-defined and are optional.

The maximum size for data line 413 on the graphical chart of FIG. 4 indicates the maximum amount of storage space that the storage system can allocate for actual user data. The maximum size for data and snapshot copies line 422 on the graphical chart of FIG. 4 indicates the maximum amount of storage space that the storage system can allocate for actual user data and snapshot copies.

As such, the administrator can also see at which point the data space crossed the originally allocated size 418 of the storage system. For example, full threshold line 412 indicates an amount of storage space where an alert would be generated if the actual amount of used storage space exceeds that threshold. In another scenario, should the administrator feel that the amount of allocated storage space for actual data is rapidly approaching the maximum size line 414, the administrator can increase the value of the maximum amount of allocated storage space as shown in FIG. 5.

Figure 5:
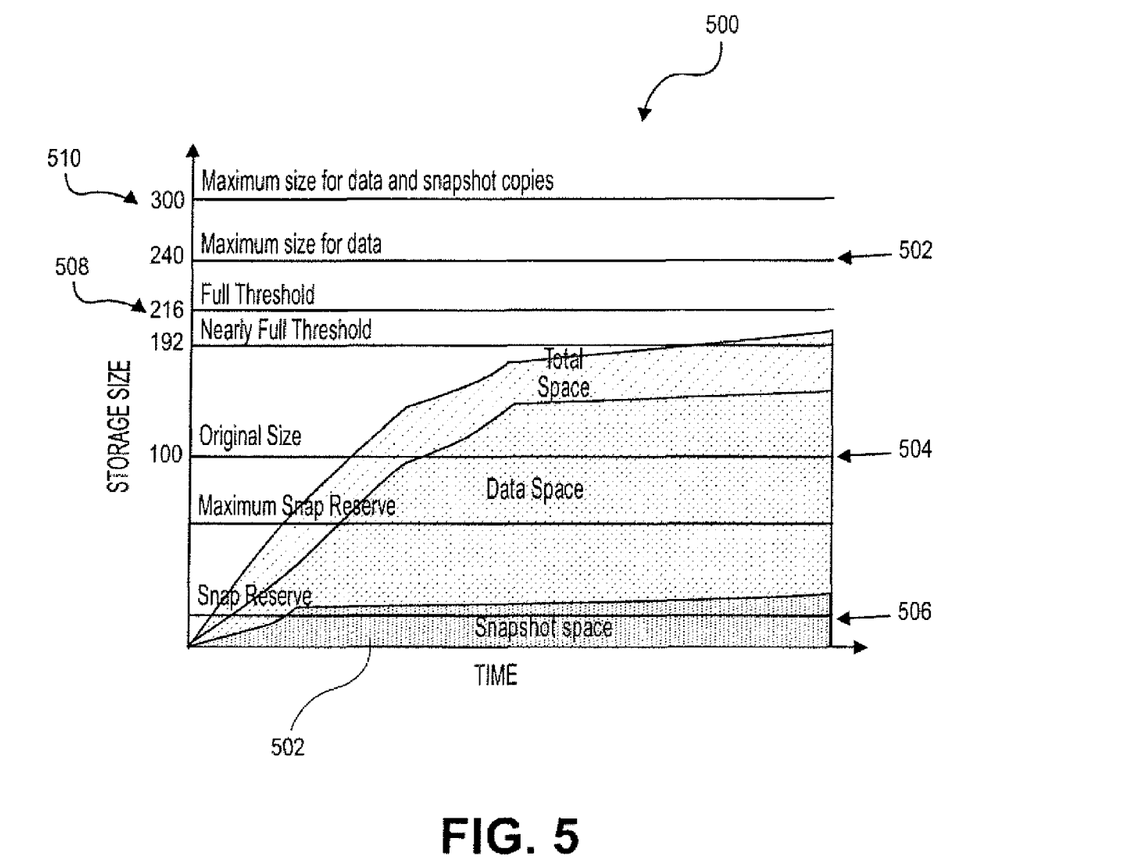
FIG. 5 is a diagram of an exemplary screen presented to a system administrator that allows the system administrator to visualize space utilization and modify provisioning settings according to an embodiment of the present invention.

FIG. 5 is a diagram of a graphical chart 500 presented to a system administrator that allows the system administrator to visualize space utilization and modify provisioning settings. The horizontal axis in FIG. 5 represents time. The vertical axis in FIG. 5 represents storage size. The modifiable settings are shown with indicator arrows 502, 504, 506 adjacent to the graphical chart 502. In one embodiment, a storage administrator can drag the lines (up or down) to increase the respective appropriate value. The (full and nearly full) thresholds 508 are adjusted automatically to the appropriate value as these are percentages of the maximum values 510.

As an example of a scenario, the storage administrator would see that the data space approaches the maximum size for data line. The storage administrator could control a pointer with a mouse or any other input device to select and "drag" maximum size line 510 upward on the graphical chart so to increase the maximum allocated storage space of the storage system. The logical data container would then automatically grow as needed to the maximum size specified. In one embodiment, the effects of the change from the storage administrator are immediately reflected on the graphical chart 500. The graphical chart 500 is dynamically updated to reflect the effects of changes to sizes and thresholds of the storage system. In contrast, the prior art describes a visualization tool where settings are entered separately from the graphical chart. The storage administrator inefficiently has to go between two different windows: one for input, and one for visualization. Furthermore, the storage administrator has to manually update the window containing the graphical chart to reflect any changes made on the separate input screen.

Figure 6:
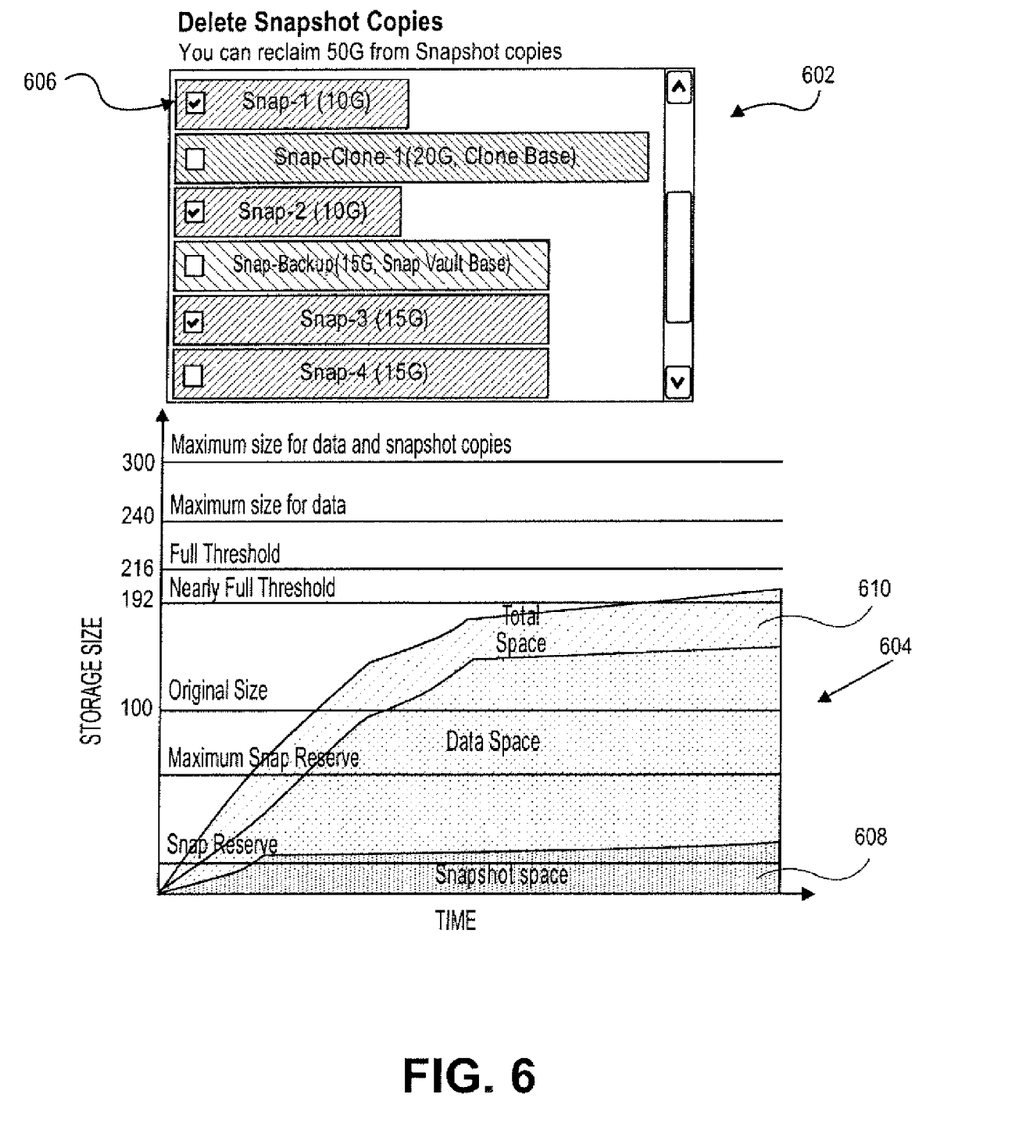
FIG. 6 is a diagram of an exemplary screen presented to a system administrator that allows the system administrator to delete snapshot copies and visualize the effects of the deletion on the space utilization according to an embodiment of the present invention.
Figure 9:
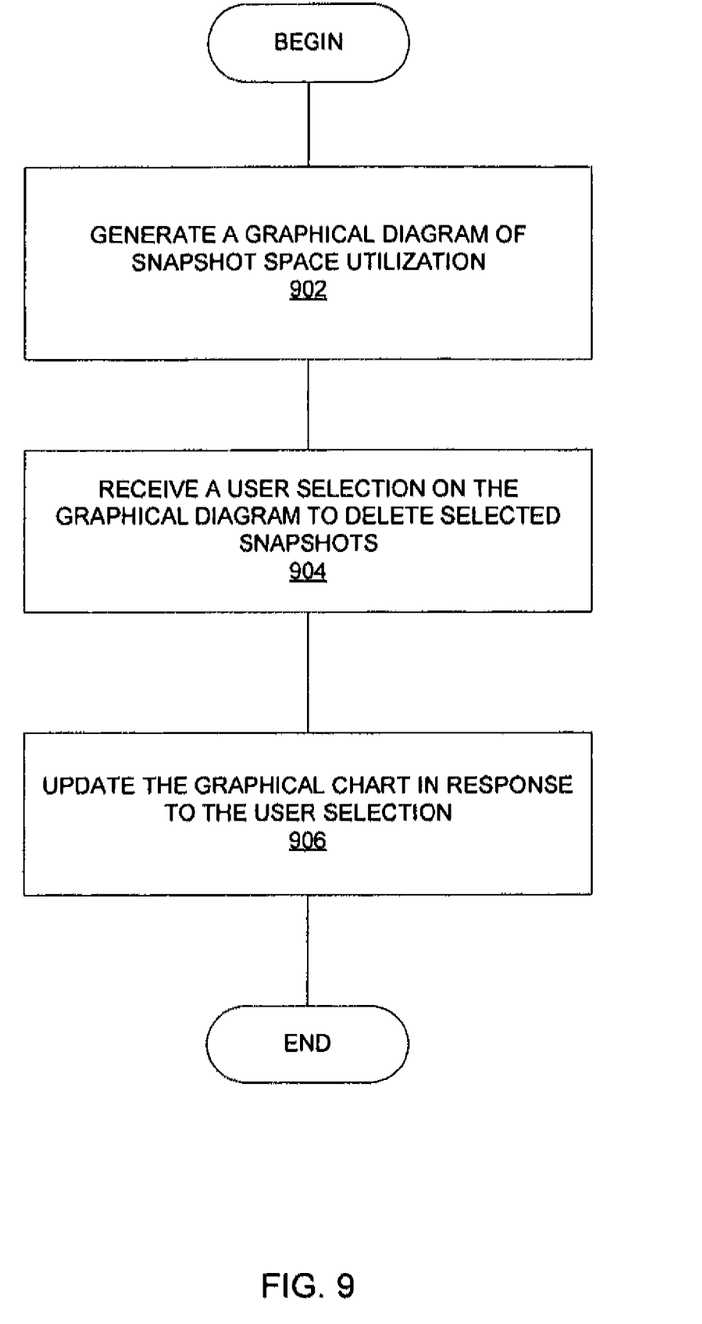
FIG. 9 is a flow diagram of steps performed to visualize the effects of deleting snapshots on storage space utilization according to an embodiment of the present invention.

FIG. 6 is a diagram of an exemplary screen presented to a system administrator that allows the system administrator to delete snapshot copies and visualize the effects of the deletion on the space utilization. A table 602 illustrates each snapshot 606 of the storage container. A storage administrator can graphically select one or more snapshots 606 for deletion. In one embodiment, some snapshots can be related to each other and therefore share the same space on the storage system. As each snapshot 606 is selected, a graph 604 is dynamically adjusted automatically to reflect the consequences of the deletion of the selected snapshot(s) without the actual deletion of the snapshot(s). The snapshot space 608 would shrink, and so would the total space values 610. This dynamic visualization is performed without the server system actually deleting the snapshots. FIG. 9 illustrates in more detail the steps performed by the server system with respect to dynamically updating the graphical chart in response to administrator selecting one or more snapshots of the storage system for deletion.

Figure 7:
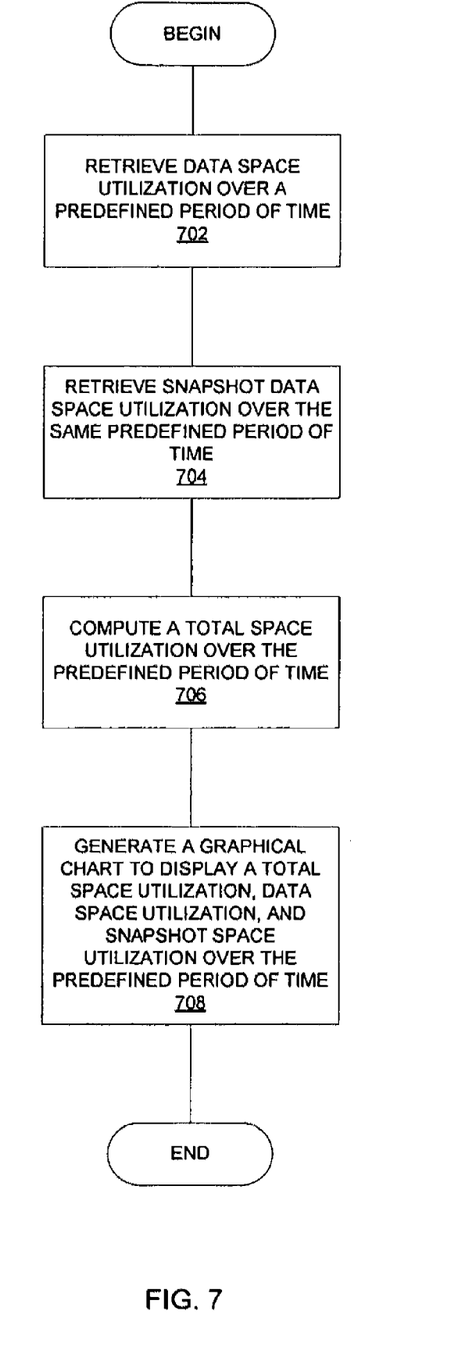
FIG. 7 is a flow diagram of steps performed to visualize storage space utilization according to an embodiment of the present invention.

FIG. 7 is a flow diagram of steps performed to visualize storage space utilization according to an embodiment of the invention. Monitoring engine 222 of a server system coupled to a storage system, monitors the amount of used storage space of the storage system organized under each type of storage use over time. At 702, monitoring engine 222 monitors the actual data space used in the storage system over a period of time. At 704, monitoring engine 222 monitors the snapshot data used in the storage system over a period of time.

Visual engine 234 retrieves the space usage data from monitoring engine 222. At 706, Visual engine 234 can then compute the total storage space used over a period of time from the data retrieved from monitoring engine 222. Visual engine 234 then generates a graphical chart illustrating a breakdown of the different types of storage use over a period of time at 708. In one embodiment, the graphical chart can include total storage space utilization, data space utilization, snapshot space utilization over the predefined period of time as illustrated in FIG. 4 where the amount of storage space utilization is represented along a vertical axis, and time is represented along a horizontal axis. In contrast, the prior art only describes displaying a total space usage over time or a space breakdown usage at one time, but not a breakdown of total space usage over time.

Figure 8:
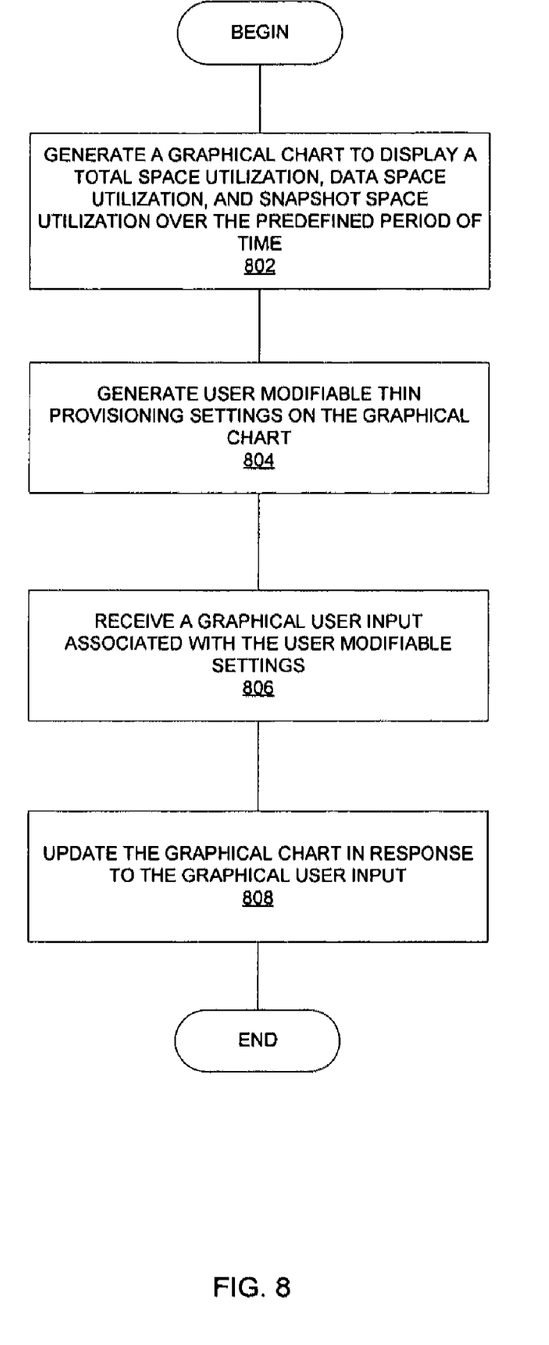
FIG. 8 is a flow diagram of steps performed to visualize the effects of modifying thin provisioning settings on storage space utilization according to an embodiment of the present invention.

FIG. 8 is a flow diagram of steps performed to visualize the effects of modifying thin provisioning settings on storage space utilization according to an embodiment. At 802, visual engine 234 generates a graphical chart using the data obtained from monitoring engine 222 to display a breakdown of space usage over a period of time. In one embodiment, the breakdown of space usage includes total storage space utilization, data space utilization, snapshot space utilization as illustrated in FIG. 5 where the amount of storage space utilization is represented along a vertical axis, and the time is represented along a horizontal axis. At 804, visual engine 234 displays user modifiable provisioning settings on the graphical chart. In one embodiment, a user-modifiable provisioning setting includes a horizontal line interlaced on the graphical chart of FIG. 5. The horizontal line represents a storage space threshold that can be set or defined by a storage administrator.

At 806, the storage administrator can click on the threshold line to set the threshold by raising or lowering the threshold line thereby increasing or decreasing the allocated amount of storage space. At 808, the graphical chart is dynamically updated in response to the graphical user input. As such, the user configuration input can be collected by receiving direct input on the graphical chart to see the effects of the potential changes to sizes and thresholds immediately. In contrast, the prior art only describes separating the display from a user input interface. The user had to input his settings on a different window separate from the actual graphical chart.

FIG. 9 is a flow diagram of steps performed to visualize the effects of deleting snapshots on storage space utilization. At 902, visual engine 234 displays a graphical diagram of individual snapshots of a storage container as shown in FIG. 6. At 904, a storage administrator selects one or more snapshots on the graphical diagram to be deleted.

In one embodiment, FIG. 6 also displays a graphical chart illustrating a breakdown of space usage over a period of time. In another embodiment, a snapshot differential engine may determine which snapshots point to the same file. Snapshot copies may be related to each other and may share space. When the storage administrator selects one or more snapshots to be deleted, snapshot differential engine determines which snapshots are common to the same unchanged file and computes the potential reclaimed storage space by discounting common storage space between the selected snapshot copies.

At 906, visual engine 234 updates a graphical chart that displays space usage over a period of time (as previously described with respect to FIGS. 4 and 5) in response to the storage administrator's selection. As such, the storage administrator can immediately see and visualize the potential effect on the space breakdown of deleting one or several snapshots without actually deleting the selected snapshots. In contrast, in the prior art, storage space that can be reclaimed could only be calculated and visualized by actually deleting the snapshots.

Although the present invention for purpose of explanation has been described with reference to specific exemplary embodiments, it will be understood that the invention is not limited to the embodiments described herein. A person of ordinary skill in the art would understand that the present invention can be practiced with modifications and alternations to those embodiments or can be practiced in other embodiments within the spirit and scope of the appended claims.

Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated. Furthermore, the use of the phrase "one embodiment" throughout does not necessarily mean the same embodiment. Although these particular embodiments of the invention have been described, the invention is not limited to these particular embodiments. Accordingly, the specification and drawings are to be regarded in an illustrative sense rather than a restrictive sense.

Moreover, the teachings of this invention can be adapted to a variety of storage system architectures including, but not limited to, a network-attached storage environment and a storage area network. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method comprising:
monitoring an amount of used storage space in a storage system with respect to different types of usage;
displaying a graphical chart of the amount of used storage space relating to a period of time, the graphical chart comprising a breakdown of the different types of usage over time and a visual indicator corresponding to a current maximum storage size of the storage system, wherein the current maximum storage size corresponds to an allocated portion of available storage;
receiving a user input to the visual indicator;
automatically changing, by a data processing system, the current maximum size of the storage system by increasing a size of the allocated portion or decreasing the size of the allocated portion by an amount corresponding to the user input to the visual indicator; and
updating the graphical chart to reflect the changed size of the storage system.

2. The method of claim 1 wherein the amount of used storage space comprises an active user data space utilization and a snapshot space utilization, and wherein the different types of usage comprise a total space utilization, an active data space utilization, and a snapshot space utilization.

3. The method of claim 1 further comprising:
receiving a selection of one or more snapshots to be deleted;
determining one or more common storage space to the selected snapshots;
computing a potential amount of reclaimed storage space based on the selection and the one or more common storage space to the selected snapshots; and
updating the graphical chart in response to the selection without actually deleting the selected snapshots.

4. A method comprising:
receiving a user input applied on a graphical chart of an amount of used storage space of a storage system relating to a period of time and a visual indicator corresponding to a current maximum storage size of the storage system, wherein the current maximum storage size corresponds to an allocated portion of available storage;
automatically changing, by a data processing system, the current maximum size of the storage system by increasing a size of the allocated portion or decreasing the size of the allocated portion by an amount corresponding to the user input to the visual indicator; and
updating the graphical chart to reflect the changed size of the storage system.

5. The method of claim 4 wherein the graphical chart comprises a breakdown of different types of usage over time.

6. The method of claim 5 wherein the amount of used storage space comprises an active data space utilization and a snapshot space utilization, and wherein the different types of usage comprise a total space utilization, an active data space utilization, and a snapshot space utilization.

7. The method of claim 4 further comprising:
receiving a selection of one or more snapshots to be deleted;
determining one or more common storage space to the selected snapshots;
computing a potential amount of reclaimed storage space based on the selection and the one or more common storage space to the selected snapshots; and
updating the graphical chart in response to the selection without actually deleting the selected snapshots.

8. A method comprising:
monitoring an amount of used storage space in a storage system with respect to different types of usage;
displaying a graphical chart of the amount of used storage space relating to a period of time and a visual indicator corresponding to a maximum storage size of the storage system, wherein the maximum storage size corresponds to an allocated portion of available storage;
receiving a selection of one or more snapshots to be deleted;
determining one or more common storage space to the selected snapshots;
computing a potential amount of reclaimed storage space based on the selection and the one or more common files to the selected snapshots;
updating the graphical chart in response to the selection without deleting the selected snapshots;
receiving a user input to the visual indicator;
automatically changing, by a data processing system, the current maximum size of the storage system by increasing a size of the allocated portion or decreasing the size of the allocated portion by an amount corresponding to the user input to the visual indicator; and
updating the graphical chart to reflect the changed size of the storage system.

9. The method of claim 8 wherein the graphical chart comprises a breakdown of the different types of usage over time.

10. The method of claim 8 wherein the amount of used storage space comprises an active data space utilization and a snapshot space utilization, and wherein the different types of usage comprise a total space utilization, an active data space utilization, and a snapshot space utilization.

11. A server system comprising:
a monitoring engine to monitor an amount of used storage space with respect to different types of usage in a storage system coupled to the server system; and
a visual engine module configured to generate a graphical user interface (GUI) comprising a graphical chart of the amount of used storage space relating to a period of time and a visual indicator corresponding to a current maximum storage size of the storage system, wherein the current maximum storage size corresponds to an allocated portion of available storage, the graphical chart comprising a breakdown of the different types of usage over time, wherein the GUI is to receive a user input applied on the graphical chart comprising dragging the visual indicator, to automatically change the current maximum size of the storage system by increasing a size of the allocated portion or decreasing the size of the allocated portion by an amount corresponding to the user input to the graphical chart, and to update the graphical chart to reflect the changed size of the storage system.

12. The server system of claim 11 wherein the GUI is to receive a selection of one or more snapshots to be deleted, wherein the visual engine module is to determine one or more common storage space to the selected snapshots, to compute a potential amount of reclaimed storage space based on the selection and the one or more common storage space to the selected snapshots, and to update the graphical chart in response to the selection without actually deleting the selected snapshots.

13. A server system comprising:
a monitoring engine to monitor an amount of used storage space with respect to a type of usage in a storage system coupled to the server system; and
a visual engine module configured to generate a graphical user interface (GUI) comprising a graphical chart of the amount of used storage space relating to a period of time and a visual indicator corresponding to a current maximum storage size of the storage system, wherein the current maximum storage size corresponds to an allocated portion of available storage, the GUI is to receive a selection of one or more snapshots to be deleted, the visual engine module is to determine one or more common files to the selected snapshots, to compute a potential amount of reclaimed storage space based on the selection and the one or more common files to the selected snapshots, and to update the graphical chart in response to the selection without actually deleting the selected snapshots, wherein the GUI is to receive a user input applied on the graphical chart comprising dragging the visual indicator, to automatically change the current maximum size of the storage system by increasing a size of the allocated portion or decreasing the size of the allocated portion by an amount corresponding to the user input to the graphical chart, and to update the graphical chart to reflect the changed size of the storage system.

14. The server system of claim 13 wherein the graphical chart comprises a breakdown of the different types of usage over the period of time.

* * * * *